UNITED STATES PATENT OFFICE.

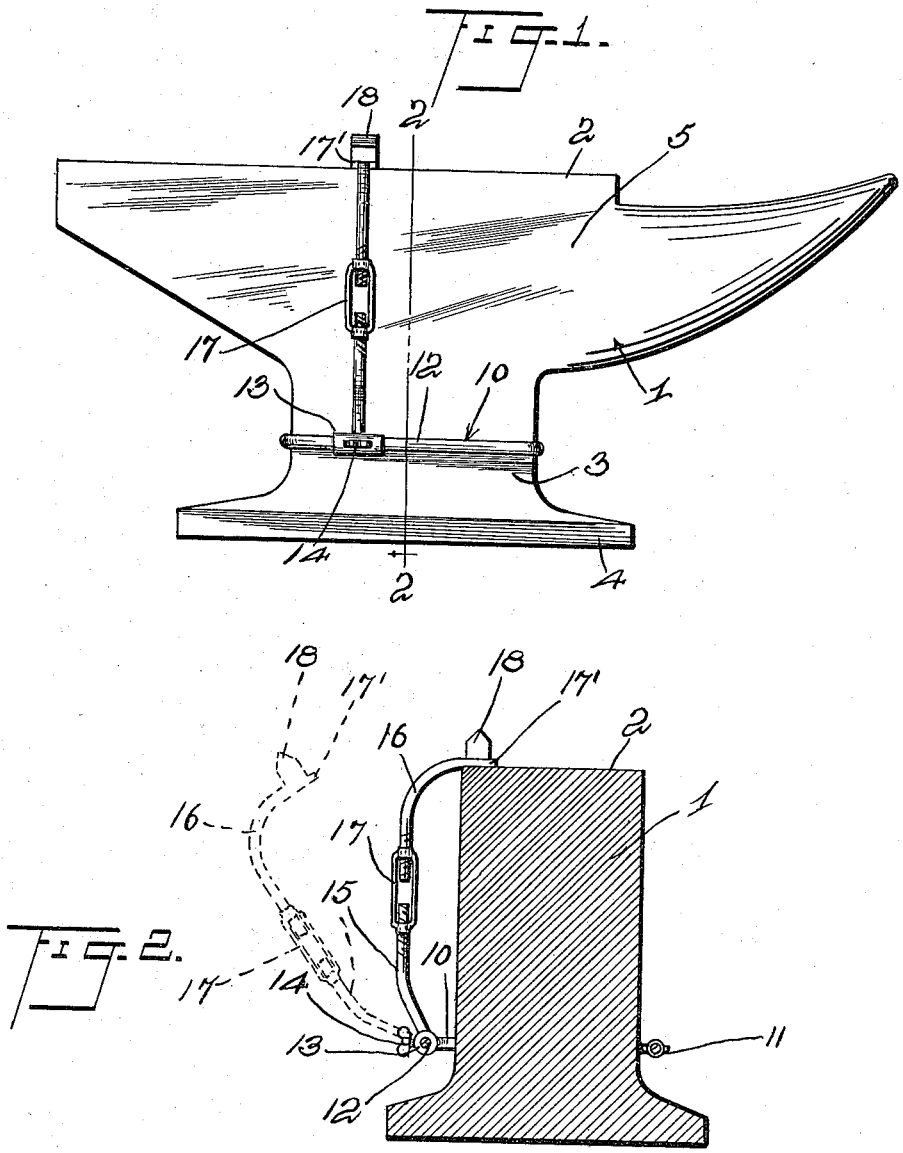

NAPOLEON J. GENDRON, OF OLYMPIA, WASHINGTON.

ANVIL ATTACHMENT.

1,147,013.

Specification of Letters Patent.

Patented July 20, 1915.

Application filed September 19, 1914. Serial No. 862,548.

*To all whom it may concern:*

Be it known that I, NAPOLEON J. GENDRON, a citizen of the United States, residing at Olympia, in the county of Thurston and State of Washington, have invented certain new and useful Improvements in Anvil Attachments; and I do hereby declare the following to be a full, clear, and exact description of the invention, such as will enable others skilled in the art to which it appertains to make and use the same.

This invention relates to attachments for blacksmiths' anvils and the primary object of the invention is the provision of an attachment for an ordinary anvil which will hold, to one side of the anvil, a hardy, fullering tool or other analogous tool whereby the tool may be easily drawn over upon the top of the anvil when it is desired to use the same.

Another object of this invention is the provision of a tool-supporting arm which is adjustable along the length of the anvil, and also which is adjustable intermediate of its ends for increasing or decreasing the length of the same for accommodation to anvils of various sizes.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like or corresponding parts throughout the several views, and in which, Figure 1 is a side elevation of an anvil of the ordinary type showing the improved fullering tool or hardy attached thereto, and Fig. 2 is a cross sectional view on the line 2—2 of Fig. 1.

Referring now more particularly to the drawings, 1 designates an anvil of the ordinary type which has a working face 2 and the supporting shank 3 which is connected to the base 4 of the anvil and the body 5. The shank 3 of the anvil has a rod clamped thereupon, which rod extends about the four sides of the anvil shank and is clamped thereon in any suitable manner such as by a turn buckle 11. The side 12 of the rod 10 is spaced from the side of the shank 3 and it has a collar 13 slidably mounted thereupon, and held in adjusted position by means of a thumb screw 14, which extends through the collar and engages the side 12 of the rod. The collar 13 has an arm 15 formed integrally therewith and extending upwardly therefrom, which arm is connected to a rod 16 by a turn buckle 17, so that the length of the arm 15 and the rod 16 combined may be varied to suit the height of the different sized anvils. The rod 16 is arcuate so that it will curve over toward the working face 2 of an anvil for permitting the flattened end 17' thereof to lie in facial abutment with the working face of the anvil as is clearly shown in Fig. 2 of the drawings.

The flattened end 17' of the rod 16 has a hardy 18 secured thereto, whereby when the end 17' lies upon the working face of the anvil the hardy 18 will be positioned for use.

The collar 13 is rotatably mounted upon the side 12 of the rod 10, so that the arm 15 and the rod 16 may be swung outwardly to the position illustrated in dotted lines in Fig. 2 of the drawings, for moving the hardy out of the way of the blacksmith working upon the anvil.

When it is desired to use the hardy or other tool which is carried by the rod 16, an ordinary blacksmith's hammer or any other suitable device may be used for engaging the hardy and pushing it forwardly by means of the swinging movement of the arm 15 and the rod 16, so that it will be positioned upon the upper working face of the anvil. When it is desired to move the hardy out of the way, so as to permit of unimpeded work upon the anvil face, the same may be merely shoved outwardly from the side of the anvil.

In reducing the invention to practice certain minor features of construction, combination and arrangement of parts may necessitate alterations to which the patentee is entitled provided such alterations are comprehended within the scope of what is claimed.

What is claimed is:

1. The combination with an ordinary blacksmith's anvil, of a rod for firm binding engagement about the anvil supporting shank, one side of said rod being spaced from one side of said anvil, a collar mounted upon said spaced side, an arm formed integral with said collar and extending upwardly therefrom, a rod adjustably connected to said arm, and a hardy carried by the upper end of said rod for movement to or from said anvil for resting upon the same.

2. The combination with an ordinary blacksmith's anvil, having a supporting shank and a working face, of a rod extending about and held in firm binding engagement with said supporting shank, one side of said rod being spaced from the corresponding side of the anvil shank, a collar rotatably and slidably mounted upon said spaced side, means for holding said collar against slidable movement, an arm formed integral with said collar and extending upwardly therefrom, a rod adjustably connected to said arm, said rod having its upper end flattened for abutting engagement with the working face of said anvil, and a hardy carried by said flattened end.

In testimony whereof I affix my signature in presence of witnesses.

NAPOLEON J. GENDRON.

Witnesses:
 THOS. G. BUSH,
 GEORGIA MELVILLE,
 LOUISE DOFFLEMYER.

Copies of this patent may be obtained for five cents each, by addressing the "Commissioner of Patents, Washington, D. C."